US005591919A

United States Patent [19]
Hathaway et al.

[11] Patent Number: 5,591,919
[45] Date of Patent: Jan. 7, 1997

[54] METHOD AND APPARATUS FOR MONITORING AND CONTROLLING TIGHTENING OF PREVAILING TORQUE FASTENERS

[75] Inventors: Thomas J. Hathaway, Farmington Hills; Frank L. Schmid, Beverly Hills; Edwin E. Rice, Ann Arbor, all of Mich.

[73] Assignee: Ingersoll-Rand Company, Woodcliff Lake, N.J.

[21] Appl. No.: 461,217

[22] Filed: Jun. 5, 1995

Related U.S. Application Data

[63] Continuation of Ser. No. 49,716, Apr. 20, 1993, abandoned.
[51] Int. Cl.$^6$ .................................... F16B 31/02
[52] U.S. Cl. ........................... 73/761; 29/407.02
[58] Field of Search .................. 73/761; 29/407, 29/240; 173/1; 81/467

[56] References Cited

U.S. PATENT DOCUMENTS

| | | | |
|---|---|---|---|
| 4,013,895 | 3/1977 | Akiyoshi et al. | 73/761 |
| 4,102,182 | 7/1978 | Brown et al. | 73/761 |
| 4,106,176 | 8/1978 | Rice et al. | 73/761 |
| 4,179,786 | 12/1979 | Eshghy | 73/761 |
| 4,305,471 | 12/1981 | Eshghy | 73/761 |
| 4,768,388 | 9/1988 | Fader et al. | 73/761 |
| 5,404,643 | 4/1995 | Rice | 73/761 |

FOREIGN PATENT DOCUMENTS

| | | | |
|---|---|---|---|
| 3128557 | 3/1983 | Germany | 73/761 |

*Primary Examiner*—Hezron E. Williams
*Assistant Examiner*—Nashimiya Ashraf
*Attorney, Agent, or Firm*—Walter C. Vliet

[57] ABSTRACT

A fastener tensioning method wherein pre-tensioning fastener tightening history acquired during the tightening of the fastener prior to the point of proportional tensioning of the fastener is utilized to modify the tightening cycle occurring after the point of proportional fastener tensioning to reduce the resultant tension scatter while using a tightening perimeter such as torque as an indicator of fastener tension.

17 Claims, 5 Drawing Sheets

METHOD AND APPARATUS FOR MONITORING AND CONTROLLING TIGHTENING OF PREVAILING TORQUE FASTENERS

This application is a continuation of application Ser. No. 08/049,716, filed Apr. 20, 1993, now abandoned.

BACKGROUND OF THE INVENTION

This invention relates generally to methods of fastener tensioning and more particularly to an improved method of monitoring and controlling the installation of prevailing torque threaded fasteners such as self-tapping fasteners, locking fasteners with plastic inserts, or other devices which exhibit a prevailing torque that varies fastener to fastener but which does not contribute to the clamping force in the joint.

It should be understood by one skilled in the art that in situations of high prevailing torque, such as described above, the measuring of the torque applied to the fastener will not adequately reflect the tension in the fastener unless consideration is given to the portion of the torque representing the prevailing torque. This has not been accomplished adequately in the prior art on a fastener by fastener tightening basis.

The foregoing illustrates limitations known to exist in present devices and methods. Thus, it is apparent that it would be advantageous to provide an alternative directed at overcoming one or more of the limitations set forth above. Accordingly, a suitable alternative is provided including features more fully disclosed hereinafter.

SUMMARY OF THE INVENTION

In one aspect of the present invention this is accomplished by an apparatus for determining fastener tension comprising a means for determining a first point of incipient constant rate of fastener tensioning in a fastener tensioning sequence; a means for dividing the fastener tensioning sequence into a plurality of tightening zones based on the incipient constant rate fastener tensioning value determined; a means for determining at least one tension related parameter in a first zone; and a means for utilizing the fastener related parameter determined in the first zone for modifying the continued fastener tensioning sequence in subsequent zones.

In addition, a method for determining and inspecting fastener tension is described comprising determining a derivative of an incremental change in a fastener tension related parameter and an incremental change in a fastener rotation related parameter; determining based on the derivative a first point of incipient constant rate of fastener tensioning in a fastener tensioning sequence; determining if the first point of incipient constant rate of fastener tensioning falls within a determined range of the fastener tension related parameter and the incremental change in a fastener rotation related parameter as a means of determining a condition of the fastener for further tensioning; dividing the fastener tensioning sequence into a plurality of tightening zones based on the incipient constant rate fastener tensioning value determined; determining at least one tension related parameter in a first zone; and utilizing the fastener related parameter determined in the first zone for modifying the continued fastener tensioning sequence in subsequent zones.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
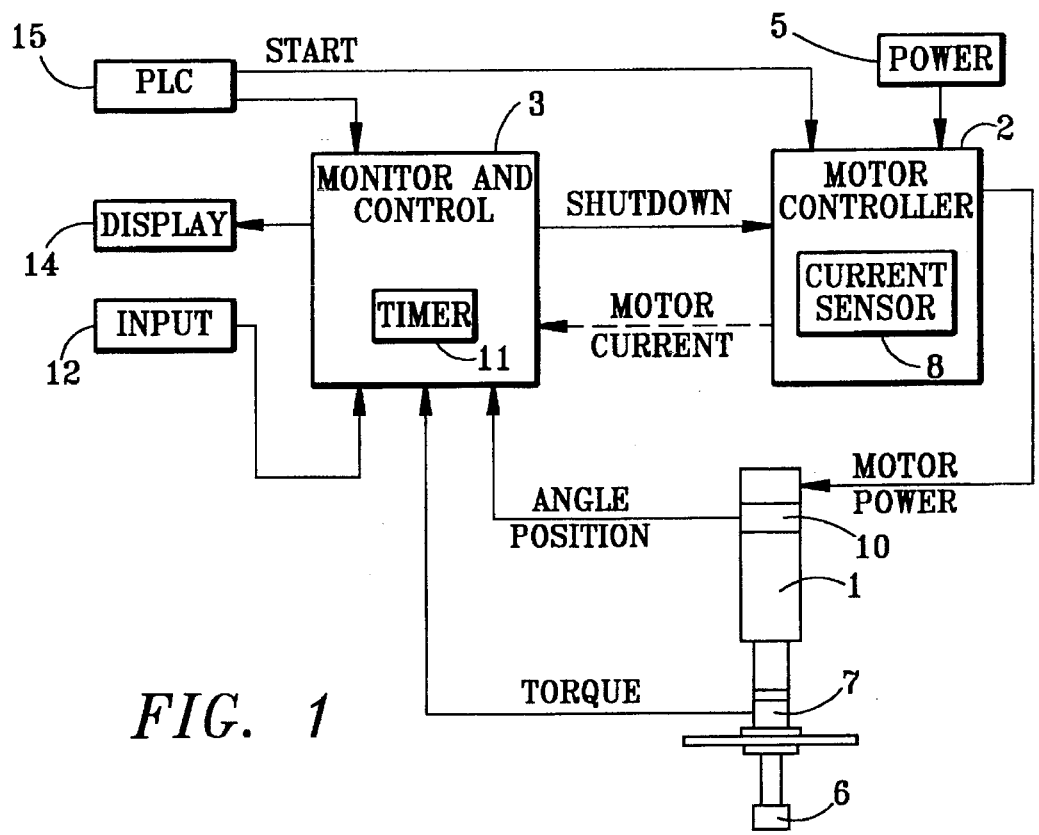
FIG. 1 is a schematic illustration of a tightening system according to the present invention.

Referring to FIG. 1, an embodiment of a power torquing system with fastener tension and rotation monitoring and control capability is shown and will be described according to the present invention. The system includes a drive unit 1, a motor control unit 2, and monitor and control unit 3. In the embodiment described, digital processes are used for units 2 and 3, although analog devices could also be used. The drive unit 1 may be an air motor or an electric motor spindle module. The power source 5 may be high pressure air or electrical energy. Torque is transferred to the fastener by a drive socket 6 on the drive unit.

To measure a tension related variable, a torque detector 7, such as a torque transducer, is provided for detecting the tightening torque applied by the drive unit. For electric motors, the tension related variable can alternatively be determined by measuring the electric current drawn by the motor since the current is proportional to the torque applied. An electric current sensor 8 can be provided in the motor control unit 2 for this purpose in the alternative use of an electric motor.

To measure a rotation related variable, an angle of turn detector 10, such as an angle encoder, is provided for detecting the incremental angle turn of the fastener. Another rotation related variable, for example, the incrementally elapsed time of a torque application, may be measured using a timer 11 in the monitor and control unit 3. The torque related and rotation related variables are readily sensed. The required torque applied (electrical current drawn by the motor) can be changed by lubrication or lack thereof (friction) in the joint. The rotation related variable which may, for example, be angle of turn or elapsed time of torque application, is merely a function of the fastener thread, the mechanical properties of the fastener, and the joint components.

The monitor and control unit 3 preferably includes a featured design to distinguish a designated torque threshold before initiating subsequent torque and rotation related measurements, thus avoiding severe distortions generally associated with low torque. The system includes an input device 12, such as a handheld terminal, for entering user selectable control and monitoring parameters into the unit 3. A display unit 14 is provided for data output. A device such as a programmable logic control 15 is used to initiate the tightening sequence and to control the order of various selectable tightenings, sequences, and functions determined by joint and user requirements.

Figure 2:
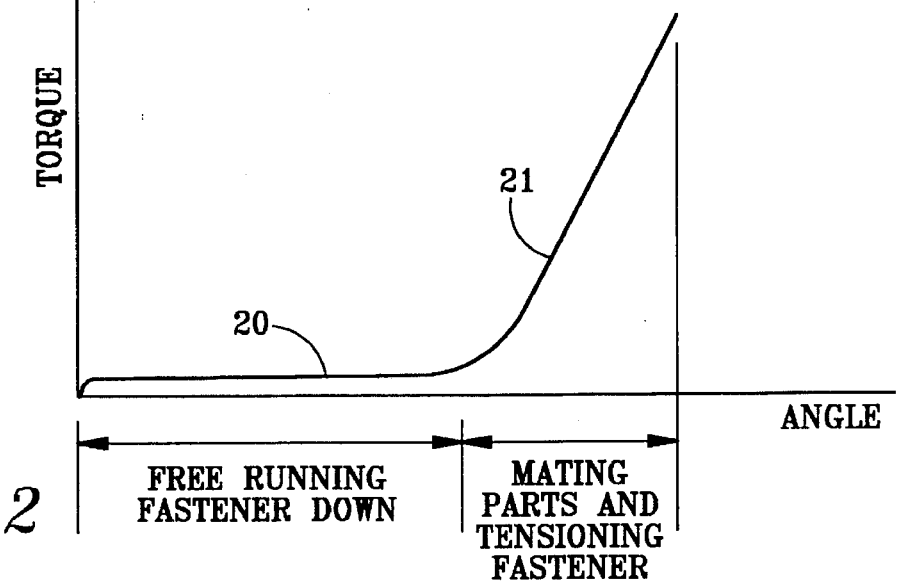
FIG. 2 is an idealized torque vs. angle curve drawn to illustrate a normal fastener tightening curve wherein the fastener does not experience high prevailing torque.

FIG. 2 shows a normal fastener rundown sequence wherein the fastener runs down (20) at a relatively low torque representing primarily thread friction followed by a period wherein the parts meet and the fastener tensioning begins (21). Typically, as the fastener turns, the fastener is elongated in tension, producing a linear stress strain or torque angle curve, as shown, as the fastener is tensioned up to its yield point (not shown in FIG. 2). Typically, at a selected torque level, the fastener rotation is stopped and the joint is considered to have been adequately compressed resulting in corresponding fastener tensile forces or tensioning of the fastener (joint compression).

There are numerous factors which result in torque being a rather inaccurate way of tensioning the fastener, including effects of friction, part fit, damage, missing parts or the like. Further, many joints exhibit the characteristic of a high prevailing rundown torque. Some of the reasons for this are closely fitted or interfering parts of threaded joints, self-tapping or self-threading fasteners or nuts, or the lack of lubrication.

Figure 3:
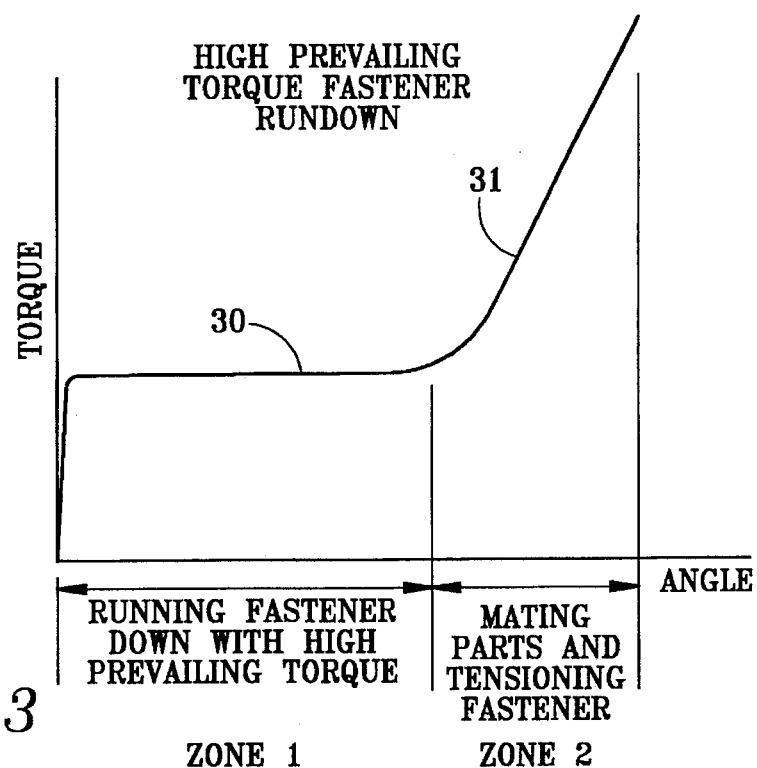
FIG. 3 is an idealized torque vs. angle curve drawn to illustrate the tightening of a fastener experiencing a constant high prevailing torque.

Such a joint is shown in FIG. 3 wherein there is a substantial period of running the fastener down with a high torque requirement (prevailing torque) (30) followed by a period similar to FIG. 2 wherein the fastener is tensioned (31). If the same shutdown torque is selected for this joint it should be apparent that the actual tensioning of the fastener may be substantially reduced, that is, less elongation of the fastener would occur.

To improve the actual fastener tension scatter experienced in various real life joints, a so-called "turn of the nut" method was developed whereby upon initiation at a certain achieved torque level the fastener was rotated an additional certain angle thereby assuring a certain degree of fastener elongation resulting from the use of the known thread characteristics to elongate the fastener during the controlled continued rotation.

Other techniques involve projections back and forth from certain known points, such as the yield point, and theoretical projections from a so-called "zero torque intercept" based on the slope of the fastener tensioning portion of the curve. Although these techniques are worthwhile and produce accurate results in certain instances, the procedure for handling situations of high prevailing torque have remained basically unsatisfactory.

Accordingly, in the present invention, means are provided to identify the point where the assembly components come together and when clamp load is starting to be applied to the assembly. Once the prevailing torque value at the point where clamp load starts to be applied to the assembly is identified, subsequent tightening parameters for the final phase (Phase II) of tightening the fastener can be modified to obtain a more uniform clamp force by compensating for the variable prevailing torque component measured in the first phase. Another improvement made possible by identifying the point where actual clamping starts is the ability to separate out the prevailing torque only phase (Phase 1) and apply inspection parameters to that phase.

The present invention provides a means to qualify the components being assembled as well as the completed assembly. This is done by putting inspection parameters on the prevailing torque in Phase I up to the point where the assembly parts come together and clamp load is starting to be applied in the second phase of the tightening cycle. Two torque components are present in Phase II (prevailing torque component and a clamping torque component). Independent monitoring and controls can be placed on the clamping torque component once its value is separated from the prevailing torque component.

Monitoring of Phase I Prevailing Torque Total Energy Method

Self-tapping (self-threading) fasteners are one common example of a high prevailing torque fastener for assembly. A method that can be used for qualifying parts with self-tapping fasteners is the calculating of the amount of energy (integration of torque and angle) required in the prevailing torque phase before actual clamping takes place and placing inspection parameters on energy used in this phase. The energy used will be a function of the amount of thread forming taking place and therefore, the energy used will be essentially proportional to the composite amount of thread engagement.

Real world applications requires that the method work on fasteners or parts that have been used more than once, i.e., fasteners which need to be untightened and retightened, and new fasteners in old parts. In other words, the method must work on reworked parts as well as virgin parts where the torque to achieve a given tension level would be reduced.

The application of a parts tracking system would provide for a means of modifying Phase I inspection parameters if a part was assembled for a second or further times.

Slope Monitoring

In addition to monitoring the total energy, other inspection parameters can be applied during Phase I. Changes in the average slope of the torque angle curve during Phase I would be an indication of a variation in thread engagement.

For example, a tapered hole (larger at the screw entrance) will cause a positive swing in slope as a mating self-tapping screw advances in the hole.

The Phase I torque angle curve may also have cyclic slope changes caused by eccentricities of the hole and/or the mating screw. In many applications, Phase I monitoring would be enhanced by averaging out the short term cyclic slope changes and evaluating the mean slope.

Improving Phase II Clamping Force Accuracy

Measuring the torque on a threaded fastener during the tightening process is a common way of controlling and/or predicting the clamping force of a fastener. The driving force for prevailing torque fasteners during clamping of the joint goes into overcoming the prevailing torque as well as supplying clamping force. When prevailing torque becomes a significant component of the total applied torque and when it varies fastener to fastener, the clamping force obtained by holding the final torque constant will have excessive scatter.

An improvement is the method of subtracting the prevailing torque component from the total applied torque measurement so that there remains a measured torque component that is much more proportional to clamp force. With the torque component that applies clamp load to the joint separated out, the ability to monitor and control final clamp load is improved.

Figure 4:
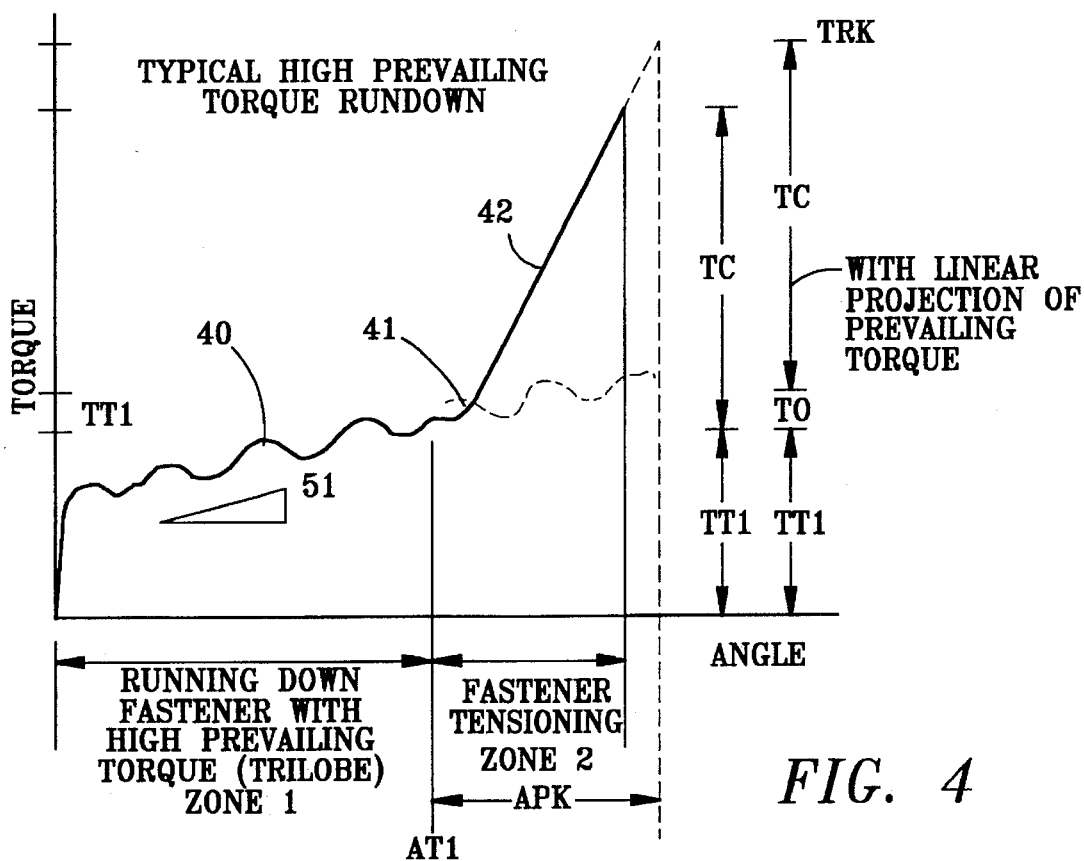
FIG. 4 is a typical torque vs. angle curve for a fastener experiencing high increasing prevailing torque rundown according to the present invention.

FIG. 4 shows a typical torque/angle curve for a high prevailing torque fastener rundown. It will be used as a model for the preferred embodiment. The strategy used in the control process is shown in the simplified flow diagram in FIG. 4. The tightening process starts in Zone 1 (40). Torque and angle are monitored. Torque divided by angle is defined as slope. When the slope exceeds a predetermined value of X, the start of Zone 2 is defined (41). At this point in time, the parameters for monitoring and/or controlling torque in Zone 2 (42) are determined. The strategy for Zone 2 is run or implemented until the end of the cycle or until another zone is detected based on system process rules.

Once the starting point 41 for Phase II is identified, methods other than torque can be used for controlling the clamp load such as angle control.

As seen in FIG. 4, the torque in Zone 1 (40) shows a slight slope. As the fastener is rundown, the torque increases because more threads are engaged. After the incipient point 41 of Zone 2 (42) is detected, torque (TT1) and angle (AT1) are recorded and used as a starting point for the strategy in Zone 2. In the preferred embodiment, torque control is used as a method for controlling clamp force. For first order control, a value of TC for desired clamp load (for torque control) is selected. When the torque has reached a value of TC+TT1 the torquing process will be ended by the electronic controller.

In reality, some of the torque applied to the fastener in Zone 2 is used to cut or form threads as in Zone 1. A further improvement, therefore, is that a value for this torque (e.g. additional thread forming torque) can be calculated based on the slope in Zone 1 and the angle of rotation in Zone 2.

Modifying the shutdown setpoint to compensate for this torque will further reduce scatter in the final clamp force in the joint. The value is shown in FIG. 4 as TO. TO in the preferred embodiment is equal to the product of the slope of the torque angle curve in Zone 1 (S1) and the angle of rotation in Zone 2 (APK). The final torque at shutdown is therefore:

$$TRK = TC + TT1 + TO$$
$$= TC + TT1 + (S1)(APK)$$

Figure 5:
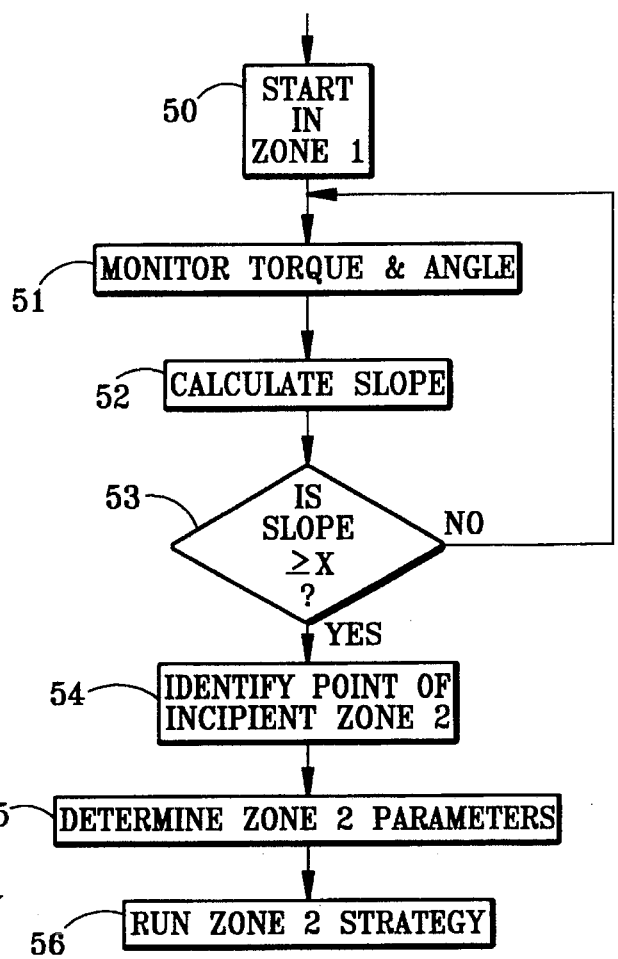
FIG. 5 is a flow chart depicting a logic sequence for tensioning a fastener displaying characteristics shown in FIG. 4.

A logic algorithm flow diagram for this is shown in FIG. 5.

Algorithm for Separating the Prevailing Torque Value from the Total Applied Torque In summary, after the start of the fastener rundown cycle 50, the torque and rotation angle is continually measured (51). If the slope 52 is below a predetermined value "X" (53) the program assumes the measured torque value is prevailing. The prevailing torque value of Phase I (40) can be used to modify tightening parameters of Phase II (42) to improve consistency of final clamp load.

If the slope changes (41) to a value equal to or greater than the predetermined value of (X) and remains above the given value of (X), the program assumes (54) it is in final rundown and clamping the joint (42). The predetermined value "X" in a simple application can be a constant. In other applications, "X" may be changed as Phase I progresses using functional characteristics of Phase I to modify "X" to determine incipient point of constant tensioning of the fastener.

The algorithms would address short term changes in the prevailing torque during Phase I of the fastener tightening by smoothing or averaging the data.

Having thus determined the incipient point of constant tensioning, the phase II control parameters are modified as discussed for the FIG. 4 embodiment above (55). Upon the continued tensioning, the rotation is halted when the determined control parameter is achieved (56).

Figure 6:
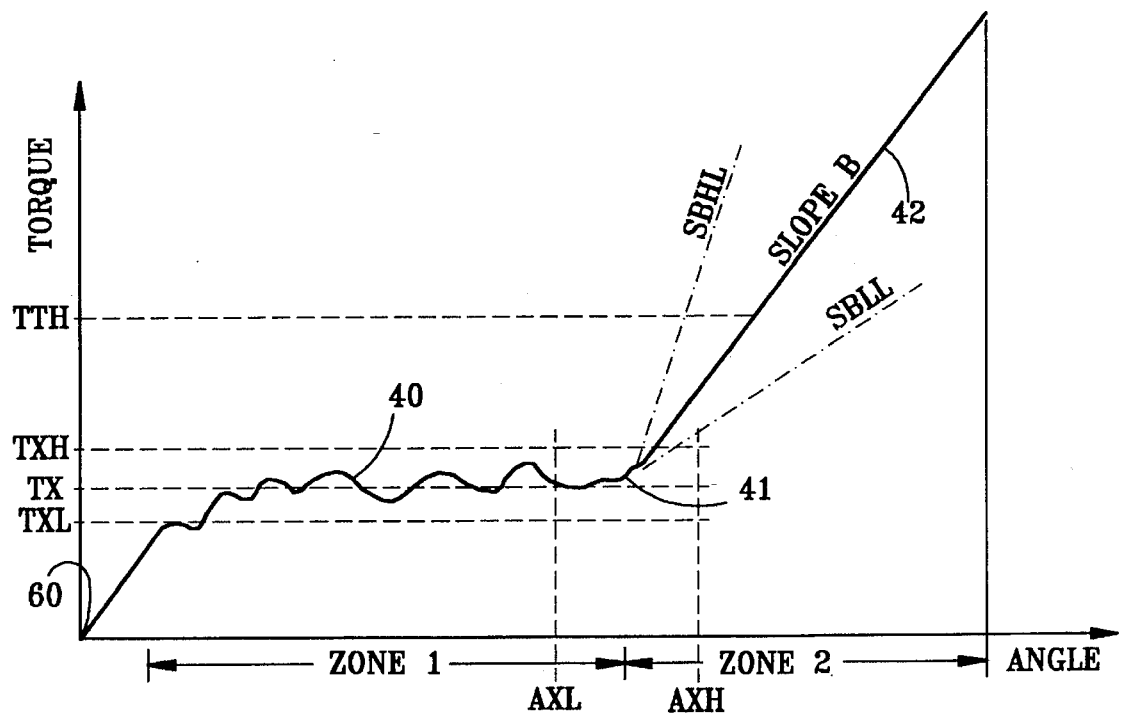
FIG. 6 is a typical torque vs. angle curve drawn to illustrate an inspection method of the incipient point of constant fastener tensioning according to the present invention.

FIG. 6 shows a preferred embodiment including an inspection strategy for a typical rundown of a fastener with prevailing torque and the logic for processing the final tightening parameters (the final tightening parameter is torque in this example).

Figure 7:
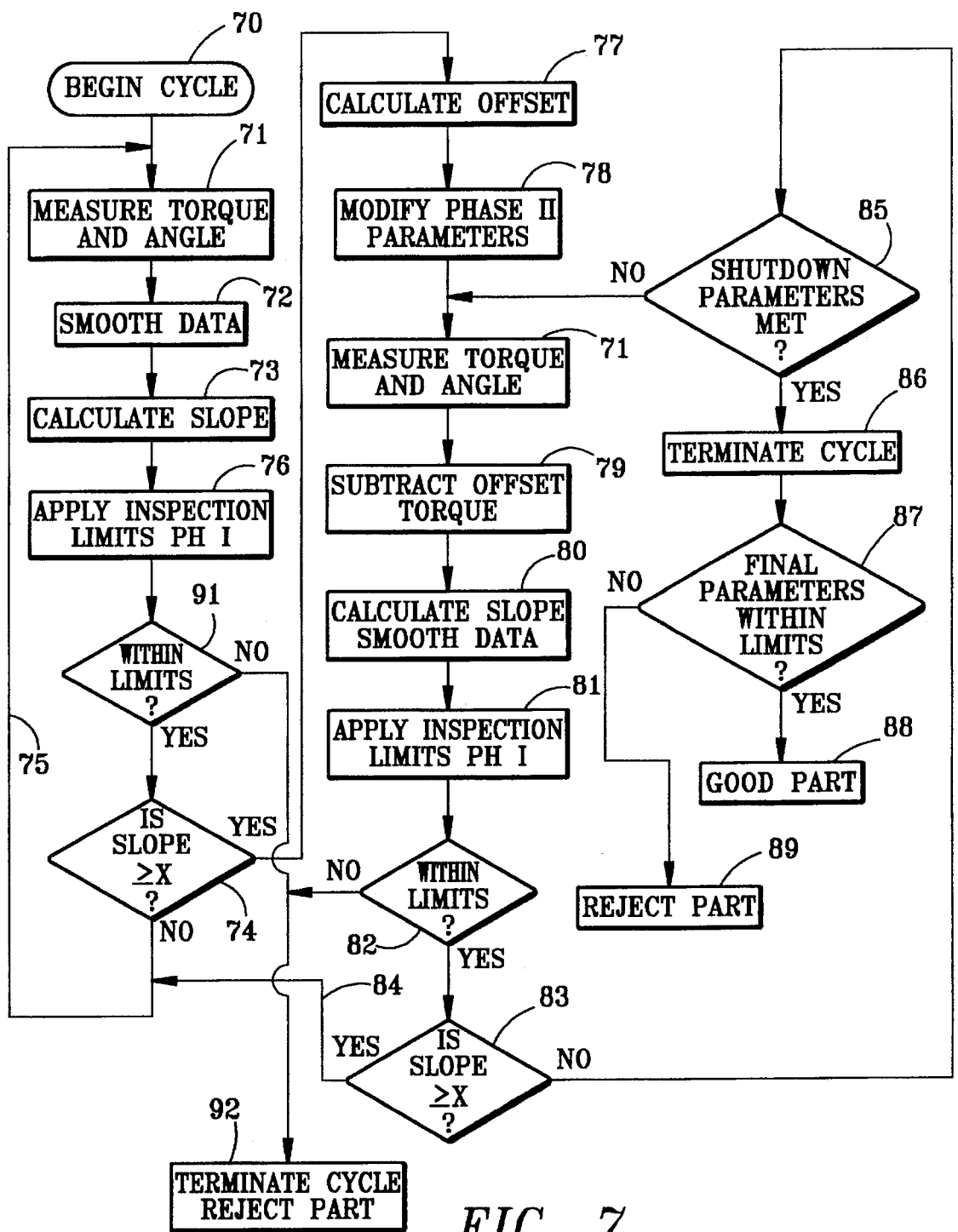
FIG. 7 is a schematic illustrating the logic sequence for controlling and inspecting the tightening of prevailing torque fasteners according to the present invention.

FIG. 7 is a more detailed logic algorithm flow diagram that describes this preferred embodiment using torque control to tighten a fastener that experiences high prevailing torque during the tightening process.

Before the motor starts running, the torque is zero (60) and no rotation is present. At the start (70) of the process, torque increases to the point required to cut or form the thread. Both the thread forming torque and the angle of rotation are monitored (71). The number of torque points and/or the angle interval over which the torque points are taken are process variables. Pre-processing or filtering of the torque measurements may be required to smooth the data so that unwanted variations can be suppressed (72).

In the preferred embodiment, the slope of the torque/angle curve is calculated (73) and compared to a slope set point parameter X (74). If the slope is greater than the parameter, X, it is assumed that the process has reached the beginning of Zone 2. An offset is determined for both torque and angle (77). If not, the procedure repeats itself (75) until the condition is met.

Inspection limits (91) are applied to the measured torque and rotation variables (76). If a reading is out of limits, the part is rejected and the cycle is terminated (92).

Based on Zone 1 observations, parameters for zone 2 may be modified (78). Torque and rotation continue to be monitored. In the preferred embodiment, a set point torque is added to the offset and the newly calculated torque is used as a set point for tool shutdown as previously described for the FIG. 5 embodiment.

The offset torque is removed from the measured torque to obtain the torque which contributes to clamping force (79). As in Zone 1, the data from the measured variables may be smoothed so that unwanted variations can be suppressed (80). Inspection parameters for the joint are applied to the data (81). If not within limits (82), the part is rejected (89).

If no fault is found, the slope is compared to X (83). If the slope falls below the limit X, it is assumed another plateau on the torque/angle curve or torque/time curve has been seen (84). The program jumps back to making Zone 1 calculations. If the slope is still above X, the process in Zone 2 continues (85) until the calculated shutdown torque has been reached (86). At this point the tool is shutdown. Final inspection limits (87) are applied to the joint and the part is either accepted (88) or rejected (89).

The above example looks for a slope value change to determine the start of clamping of the joint. Other change in slope methods such as rate of change can also be modified and used to determine the joint has started to clamp up. The "Knee" in a positive changing slope in a torque angle curve may be used as an inspection and/or control point.

In addition, several other inspection procedures may be utilized with the knee 41 determination. For example, referring to FIG. 6, the torque TX at the knee point 41 may be compared with a higher torque limit TXH and a lower torque limit TXL to determine if the torque TX at the knee 41 occurs within a predetermined range of acceptability between TXL and TXH. Likewise, the angle of rotation at the knee 41 may be compared between a lower acceptable angle of turn AXL and a higher limit angle of rotation AXH to determine if the fastener has rotated sufficiently from the initiation point to the point of linear fastener tensioning.

In addition, once the proportional slope B (42) has been determined it may be compared against a low slope limit SBL and a high slope limit SBHL to determine if the slope B falls within an acceptable range as a means of inspecting the fastener condition.

Figure 8:
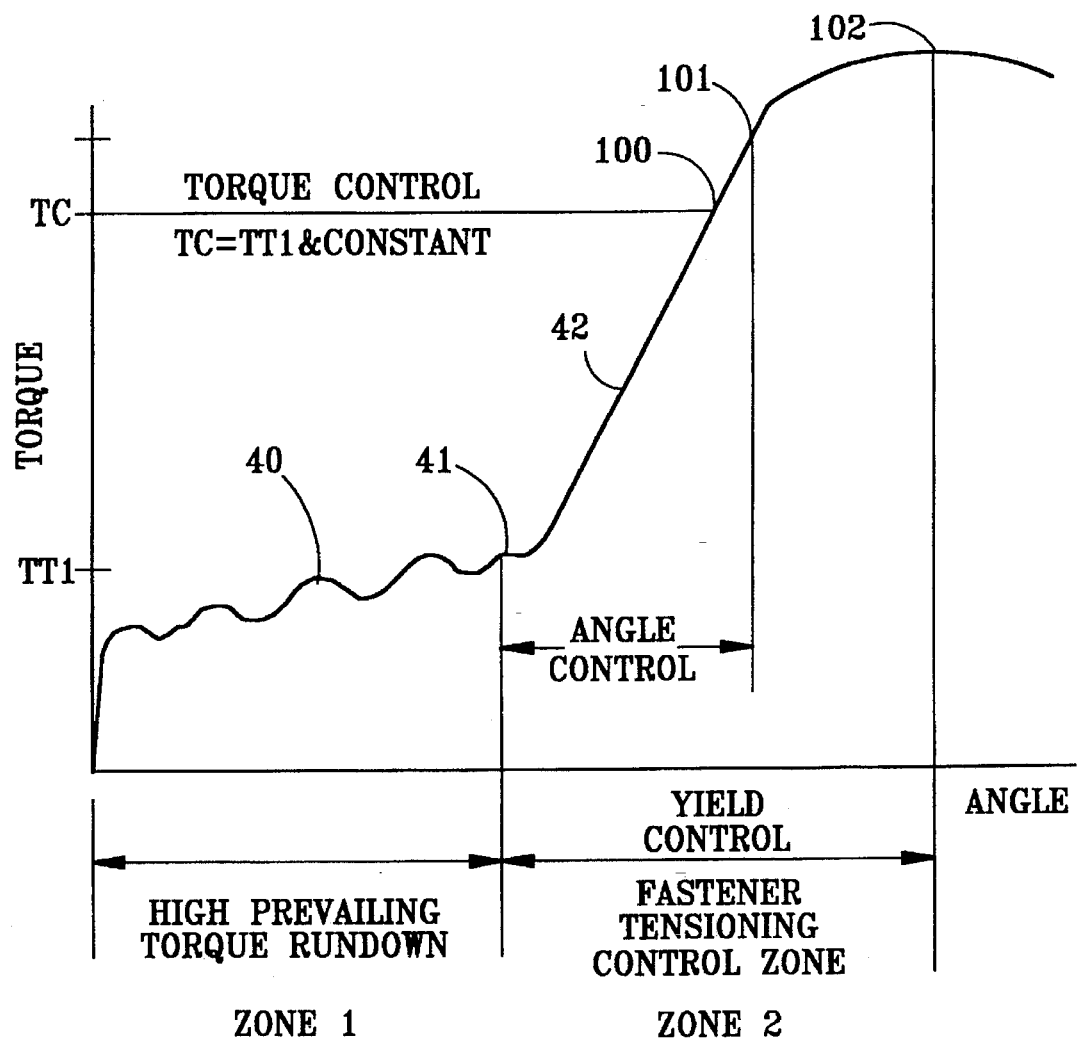
FIG. 8 is a composite torque vs. angle curve drawn to illustrate a number of alternative shutdown control sequences effected according to the present invention.

In addition, as shown in FIG. 8, several other fastener tightening strategies may be implemented upon the determination of the knee 41. For example, a turn of the nut type fastener tightening sequence may be initiated at the knee by, for example, adding a constant angle to the angle at which the knee occurs resulting in a tightening control shutoff point 101. This compares to the torque control point 100 arrived at, as previously described, by adding a constant torque to the torque at the knee. Alternatively, a well-known yield point control may also be utilized resulting in shutoff at point 102 on the torque angle curve.

Numerous other alternatives will occur to one skilled in the art resulting from the identification of the knee 41 in conjunction with its determination at elevated torque resulting from utilization of high prevailing torque type fasteners or the like.

What is claimed is:

1. An apparatus for determining fastener tension in a fastener tightening sequence wherein a fastener is rotated by a power source to achieve a desired clamping load and resultant tension in the fastener comprising:

a means for determining a value of a first point of incipient constant rate of fastener tensioning in a fastener tightening sequence;

a means for dividing said fastener tightening sequence into a plurality of tightening zones differentiated by said first point of incipient constant rate of fastener tensioning;

a means for determining at least one tension related parameter of the fastener associated with fastener tightening in a first free running zone of said plurality of tightening zones occurring prior to said first point of incipient constant rate of fastener tensioning value; and a means for utilizing said at least one tension related parameter determined in said first zone prior to said first point of incipient constant rate for modifying said fastener tightening sequence continuing in subsequent zones.

2. An apparatus for determining fastener tension according to claim 1, wherein said incipient constant rate of fastener tensioning is determined by a derivative of an incremental change in the fastener tension related parameter and an incremental change in a fastener rotation related parameter.

3. An apparatus for determining fastener tension according to claim 2, wherein said at least one fastener tension related parameter comprises a torque applied to said fastener during said tightening sequence.

4. An apparatus for determining fastener tension according to claim 2, wherein said fastener rotation related parameter comprises an angle of rotation applied to said fastener during said tightening sequence.

5. An apparatus for determining fastener tension according to claim 2, wherein said at least one fastener tension related parameter comprises a component of said power applied to drive said fastener during the tightening sequence.

6. An apparatus for determining fastener tension according to claim 2, wherein said fastener rotation related parameter comprises time of rotation applied to said fastener during said tightening sequence.

7. A method for determining fastener tension in a fastener tightening sequence wherein a fastener is rotated by a power source to achieve a desired clamping load and resulting tension in the fastener comprising:

determining a value of a first point of incipient constant rate of fastener tensioning in a fastener tightening sequence;

dividing said fastener tightening sequence into a plurality of tightening zones based on said first point of incipient constant rate of fastener tensioning value determined;

determining at least one fastener tension related parameter of the fastener associated with free running fastener tightening in a first zone of said plurality of tightening zones occurring prior to said point of incipient constant rate of fastener tensioning value; and utilizing said fastener tension related parameter determined in said first zone for modifying a running fastener tightening sequence in subsequent zones.

8. A method for determining fastener tension according to claim 7, wherein said incipient constant rate of fastener tensioning is determined by a derivative of an incremental change in the fastener tension related parameter and an incremental change in a fastener rotation related parameter.

9. A method for determining fastener tension according to claim 8, wherein said fastener tension related parameter comprises a torque applied to said fastener during the tightening sequence.

10. A method for determining fastener tension according to claim 8, wherein said fastener rotation related parameter comprises an angle of rotation applied to said fastener during said tightening sequence.

11. A method for determining fastener tension according to claim 8, wherein said fastener tension related parameter comprises a component of power applied to drive said fastener during said tightening sequence.

12. A method for determining fastener tension according to claim 8, wherein said fastener rotation related parameter comprises time of rotation applied to said fastener during said tightening sequence.

13. A method for determining and inspecting fastener tension comprising:

rotating a fastener by a power source;

determining a derivative value of an incremental change in a fastener tension related parameter and an incremental change in a fastener rotation related parameter;

determining based on said derivative value a first point of incipient constant rate of fastener tensioning in a fastener tightening sequence;

determining if said first point of incipient constant rate of fastener tensioning falls within pre-determined ranges of said fastener tension related parameter and said incremental change in a fastener rotation related parameter as a means for determining a condition of said fastener for further tensioning;

dividing said fastener tightening sequence into a plurality of tightening zones based on said incipient constant rate of fastener tensioning value determined;

determining said fastener tension related parameter of the fastener associated with free running prevailing torque fastener tightening in a first zone of said plurality of tightening zones occurring prior to said point of incipient constant rate fastener tensioning value; and utilizing said fastener tension related parameter determined in said first zone for modifying a continued fastener tightening sequence in subsequent zones.

14. A method for determining fastener tension according to claim 13, wherein said fastener rotation related parameter comprises time of rotation applied to said fastener during said tightening sequence.

15. A method for determining fastener tension according to claim 13, wherein said fastener tension related parameter comprises a torque applied to said fastener during said tightening sequence.

16. A method for determining fastener tension according to claim 13, wherein said fastener rotation related parameter comprises an angle of rotation applied to said fastener during said tightening sequence.

17. A method for determining fastener tension according to claim 13, wherein said fastener tension related parameter comprises a component of power applied to drive said fastener during said tightening sequence.

* * * * *